United States Patent [19]

Hamilton, Jr.

[11] 3,866,805
[45] Feb. 18, 1975

[54] DISPENSING APPARATUS WITH A TRAP CHAMBER PULVERULENT

[76] Inventor: Earl F. Hamilton, Jr., 636 Rayham Ct., Indianapolis, Ind. 46234

[22] Filed: Oct. 5, 1973

[21] Appl. No.: 403,807

[52] U.S. Cl. .............................................. 222/427
[51] Int. Cl. ........................................... G01f 11/46
[58] Field of Search.................... 222/248, 455, 427

[56] References Cited
UNITED STATES PATENTS

| | | | |
|---|---|---|---|
| 2,207,395 | 7/1940 | Brown | 222/248 |
| 2,446,582 | 8/1948 | Gopner | 222/248 X |
| 2,472,688 | 6/1949 | Wydra | 222/248 |
| 2,752,076 | 6/1956 | Locker | 222/455 |
| 3,308,995 | 3/1967 | Lee et al. | 222/427 |

Primary Examiner—Stanley H. Tollberg
Assistant Examiner—Norman L. Stack, Jr.
Attorney, Agent, or Firm—Woodard, Weikart, Emhardt & Naughton

[57] ABSTRACT

This invention relates to a volumetric dispensing apparatus which can be attached to various conventional containers. The apparatus is operated by rotating a portion of the cap about the axis of the container through about 90° back and forth, one pass in each direction. It is intended to precisely measure a predetermined amount of coffee or other pulverulent material. Use of this invention permits the measurement and dispensing of material in exactly the volume desired without the normal disadvantage of such a device, i.e. exposure of the material to be dispensed to atmospheric contamination such as moisture.

5 Claims, 4 Drawing Figures 3,866,805

DISPENSING APPARATUS WITH A TRAP CHAMBER PULVERULENT

BACKGROUND OF THE INVENTION

1. Field of the Invention

This invention relates generally to cap type volumetric dispensers.

2. Description of the Prior Art

The prior art discloses several cap type dispensing devices. A sample patent teaching an apparatus for delivering measured volumetric quantities of granular material is U.S. Pat. No. 2,752,076 issued in 1956 to Locker. In addition, U.S. Pat. No. 2,472,688 issued to Wydra in 1949 discloses a wall-mounted dispenser having an internal rotation member. Deficiencies which are commonly noted among prior art patents are (a) extended exposure of the material to be dispensed to atmospheric contaminants such as moisture, (b) poor rigidity and strength of parts making up the dispensing apparatus, (c) a multiplicity of parts in the dispensing apparatus preventing convenient maintenance and cleaning, (d) loss of material in cap type dispensers when the cap is removed, (e) excessive cost of the container-dispenser apparatus, and (f) nonattachment of the dispensing means to the bottle or can containing the material.

SUMMARY OF THE INVENTION

Described briefly, in a typical embodiment of the present invention, a stationary cap is provided which has an internally threaded member which screws onto conventional containers of various pulverulent materials. Fixedly attached to said internally threaded member is a rotatable member having an external aperture. A ratchet rotated inner wheel is received within said stationary member and is retained by said rotatable member. The cap dispenser apparatus of this invention works by manually rotating the above mentioned rotating member of the cap about the axis of the container and cap through approximately 90° back and forth, one pass in each direction. If this is done with the container and cap dispenser over an appropriate receptacle such as a cup or glass for the pulverulent material, a dispensing action occurs whereby an appropriate predetermined amount of pulverulent material is dispensed into said receptacle.

It is therefore an object of this invention to provide a cap dispenser which can be mounted on the pulverulent material container and function as both a cap and volumetric dispensing device.

It is a further object of this invention to provide a cap dispenser which is constructed of durable, rigid material while at the same time being easily maintained and cleaned.

It is a still further object of this invention to provide a cap dispenser which is inexpensive to purchase and operate.

These and related objects will be apparent from the following description of the drawings and preferred embodiment of the invention.

BRIEF DESCRIPTION OF THE DRAWINGS

The full nature of the invention will be understood from the accompanying drawings and the following description and claims.

DESCRIPTION OF THE PREFERRED EMBODIMENT

Figure 1:
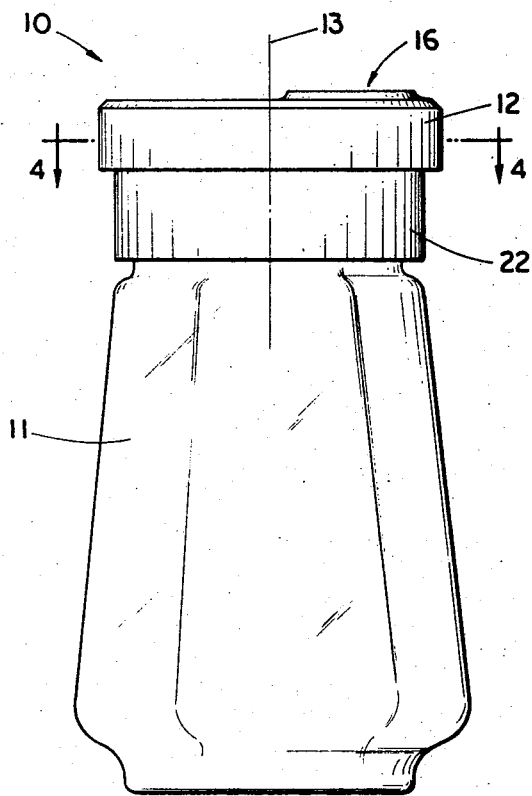
FIG. 1 is a front elevation showing the cap dispenser as it is attached to a conventional container.

Referring now to FIG. 1, the cap dispenser apparatus of this invention is shown in its attached relationship to container 11 of pulverulent material. As is more clearly shown in FIGS. 2 and 3, cap dispenser 10 consists of three basic working parts. A stationary member 22 has internal threads 15 which are screwed onto external threads 14 of container 11 to provide a fixed relationship between cap dispenser 10 and container 11. Rotational member 12 is attached to stationary member 22 by means of upwardly extending fingers 35 positioned around the entire circumference of stationary member 22 and forming a part thereof. Fingers 35 engage rotational member 12 at recess 52 thus fixing rotational member 12 to stationary member 22.

Ratchet rotated internal wheel 17 is rotatably received within stationary member 22 and is retained therein by rotatable member 12. Both rotatable member 12 and inner wheel 17 are rotatable about vertical axis 13. Rotatable member 12 may be rotated through 90° in both a clockwise and counterclockwise direction. Inner wheel 17 may be rotated only in a clockwise direction as viewed in FIG. 2. Each opening 18 of inner wheel 17 is a predetermined volumetric size, normally one teaspoon or other suitable amount for use in a volumetrically dispensed product.

Stationary member 22 has internal aperture 19 which is aligned with and congruent to an opening 18 of inner wheel 17. Both inner aperture 19 and opening 18 are congruent to external aperture 16 which is in rotatable member 12. After rotation opening 18 is aligned with outer aperture 16 and a dispensing action can occur, while at the same time another opening 18 which is aligned with internal aperture 19 is charged with pulverulent material.

Figure 3:
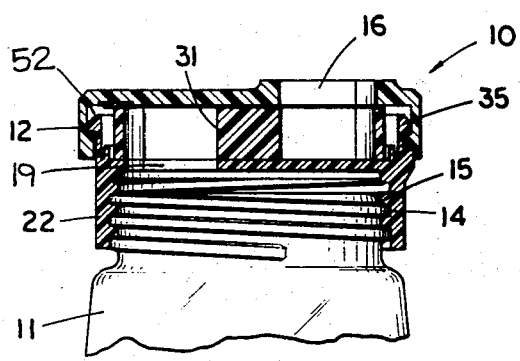
FIG. 3 is a section taken at line 3—3 of FIG. 2 and viewed in the direction of the arrows.
Figure 4:
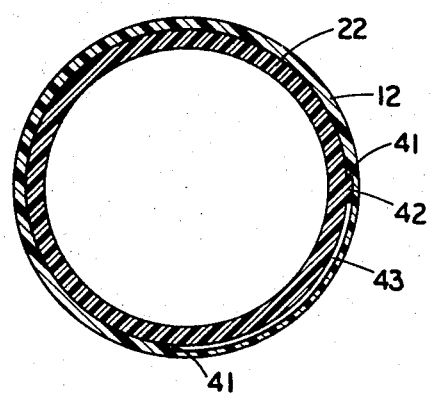
FIG. 4 is a section taken at line 4—4 of FIG. 1 and viewed in the direction of the arrows.

Leaf spring 20 is attached at its proximal end 50 to rotatable member 12. Distal end 51 of spring 20 is bent downward slightly and is designed to engage notch 60 to rotate inner wheel 17. Referring now to FIGS. 3 and 4, rotation of rotatable member 12 is limited by lug 42 which is a part of stationary member 22 and which is received in slot 43 of rotational member 12. End stops 41 and 41' (the ends of the slot 43) which are spaced approximately 90° apart define the limit of relative travel of lug 42 in slot 43. Rotatable member 12 is therefore rotatable through 90° by relative movement of lug 42 in slot 43.

Figure 2:
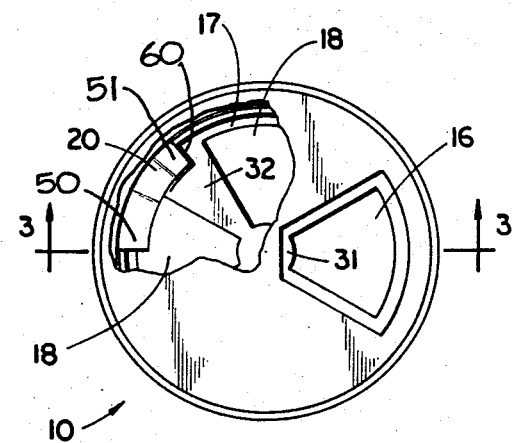
FIG. 2 is a top plan view thereof, with portions broken away to show interior details.

Referring now to FIG. 2, it can be seen that inner wheel 17 is ratched rotated by means of a leaf spring 20. Leaf spring 20 is attached to rotatable member 12 at its proximal end 50 by means of an epoxy glue, by screw or by other conventional fastening means. As rotatable member 12 is pivoted back and forth about axis 13, leaf spring 20 is biased against the wheel 17. In the illustrated embodiment, the member 12 is pivoted through 90°. The wheel 17 has four notches 60 spaced at 90° intervals around the wheel and located in spokes 32 of wheel 17. When the member 12 is rotated clockwise as viewed in FIG. 2, the notch 60 (exposed in FIG.

2) is engaged by the spring 20 and is also rotated through 90°. The member 22 has an opening 19 therethrough which is shaped identically to openings 18 and permits flow of the coffee or like into the opening 18 with which the opening 19 is aligned. When an opening 18 which has been charged with the pulverulent material is aligned with external aperture 16 a dispensing action occurs. A predetermined volumetric amount of pulverulent material is dispensed into a suitable receptacle such as a coffee cup, hot tea cup, ice tea glass and the like.

As an alternative embodiment of the cap dispenser of this invention, the inner wheel 17 can be made in various thicknesses and be subdivided into as many openings 18 as are desired by the user. In any modification of the inner wheel a corresponding modification of internal aperture 19 and external aperture 16 must also be made so that openings 18 will align with and be congruent to said internal and external apertures.

While the invention is illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. An apparatus for dispensing pulverulent material from a container with said container having a first outlet opening downwardly comprising:

a ring having a top end and a bottom end with said top end adapted to be mounted to said first outlet, said ring including a lid wall mounted between said top end and said bottom end and adapted to extend across and cover said first outlet with said lid wall having a second opening to allow passage of pulverulent material;

a cap with a third opening, said cap being rotatably mounted to said bottom end of said ring, said cap having means engageable with said ring operable to limit rotational movement of said cap from a rotor engaging position to a dumping position and back to said rotor engaging position and further operable to limit rotational movement of said cap to prevent said third opening from overlapping said second opening;

a one-way rotatable rotor mounted to said bottom end of said ring between said lid wall and said cap with said rotor being rotatable about an axis in a given direction, said rotor including a plurality of radially extending vanes forming a plurality of pulverulent material storage spaces with one each of said spaces being located between two each of said vanes, said vanes being positioned to simultaneously align one of said spaces with said second opening and another of said spaces with said third opening when said cap is in said rotor engaging position, said rotor including a plurality of leaf spring receiving recesses with one each of said recesses being provided for one each of said storage spaces; and, a leaf spring having a proximal end mounted to said cap between said cap and said rotor, said spring having a distal end with said spring extending from said proximal end to said distal end in said given direction, said distal end being spring biased into one of said recesses to force said rotor to rotate with said cap as said cap is rotated from said rotor engaging position to said dumping position, said distal end being yieldable to disengage said rotor and allow said rotor to be stationary as said cap is rotated to said rotor engaging position.

2. The apparatus of claim 1 wherein:

said rotor includes a most outward peripherally extending wall mounted to said vanes;

said ring has a circular lip on said lid wall projecting toward said cap and positioned outwardly of and adjacent said peripherally extending wall limiting lateral movement of said rotor.

3. The apparatus of claim 2 wherein:

said rotor includes four of said radially extending vanes forming four of said pulverulent material storage spaces with one each of said vanes being located every ninety degrees around said axis;

said means limits maximum rotational movement of said cap in any direction to ninety degrees around said axis.

4. The apparatus of claim 3 wherein:

said bottom end of said ring includes radially extending projections with said cap including a circular recess slidably receiving said radially extending projections securing said ring to said cap.

5. The apparatus of claim 4 wherein:

said ring includes a boss mounted exteriorly to said ring projecting into and slidably received by said cap.

* * * * *